United States Patent
Yasumoto et al.

(10) Patent No.: US 11,098,184 B2
(45) Date of Patent: Aug. 24, 2021

(54) MASTERBATCH COMPOSITION

(71) Applicant: BASELL POLIOLEFINE ITALIA S.R.L., Milan (IT)

(72) Inventors: Kazuhisa Yasumoto, Kawasaki (JP); Miyuki Abe, Kawasaki (JP); Takeshi Nakajima, Kawasaki (JP)

(73) Assignee: Basell Poliolefine Italia S.r.l., Milan (IT)

( * ) Notice: Subject to any disclaimer, the term of this patent is extended or adjusted under 35 U.S.C. 154(b) by 109 days.

(21) Appl. No.: 16/471,986

(22) PCT Filed: Dec. 18, 2017

(86) PCT No.: PCT/JP2017/046271
§ 371 (c)(1),
(2) Date: Jun. 20, 2019

(87) PCT Pub. No.: WO2018/117271
PCT Pub. Date: Jun. 28, 2018

(65) Prior Publication Data
US 2020/0024434 A1 Jan. 23, 2020

(30) Foreign Application Priority Data

Dec. 20, 2016 (JP) .............................. JP2016-246290

(51) Int. Cl.
*C08L 23/12* (2006.01)
*C08L 23/08* (2006.01)
*C08L 23/14* (2006.01)
*C08L 53/00* (2006.01)

(52) U.S. Cl.
CPC ............ *C08L 23/12* (2013.01); *C08L 23/0815* (2013.01); *C08L 23/142* (2013.01); *C08L 53/00* (2013.01); *C08L 2203/30* (2013.01); *C08L 2205/025* (2013.01); *C08L 2310/00* (2013.01); *C08L 2314/06* (2013.01)

(58) Field of Classification Search
CPC ...... C08L 23/12; C08L 23/14; C08L 23/0815; C08L 23/42; C08L 53/00; C08L 2314/06; C08L 2203/30; C08L 2205/025; C08L 2310/00

See application file for complete search history.

(56) References Cited

U.S. PATENT DOCUMENTS

| 8,008,400 B2 | 8/2011 | Pelliconi et al. |
| 2014/0303310 A1 | 10/2014 | Fantinel et al. |

FOREIGN PATENT DOCUMENTS

| EP | 1939251 A1 | 7/2008 |
| JP | 2003-301086 A | 10/2003 |
| JP | 2006124454 A | 5/2006 |
| JP | 2015-113363 A | 6/2015 |
| JP | 2017-136702 A | 8/2017 |
| WO | 2010/108866 A1 | 9/2010 |
| WO | 2011/076553 A1 | 6/2011 |

OTHER PUBLICATIONS

International Search Report and Written Opinion dated Mar. 13, 2018 (Mar. 13, 2018) for Corresponding PCT/JP2017/046271.

*Primary Examiner* — Sanza L. McClendon

(57) ABSTRACT

A masterbatch composition made from or containing:
65 to 85 wt % of a propylene homopolymer or copolymer as component (1) containing 0 to 3 wt % of ethylene or one or more C4-C10-α-olefin-derived units; and
15 to 35 wt % of a propylene-ethylene copolymer as component (2) containing 25 to 35 wt % of ethylene-derived units,
wherein the masterbatch composition has:
1) a melt flow rate (230° C., load: 21.18 N) of 5 to 30 g/10 minutes; 2) xylene insolubles with an Mw of $10 \times 10^4$ to $30 \times 10^4$ and an Mw/Mn of 6 to 20 as measured by GPC; and 3) xylene solubles with an intrinsic viscosity of 5.5 to 9.0 dl/g.

8 Claims, 3 Drawing Sheets

[Figure 1]
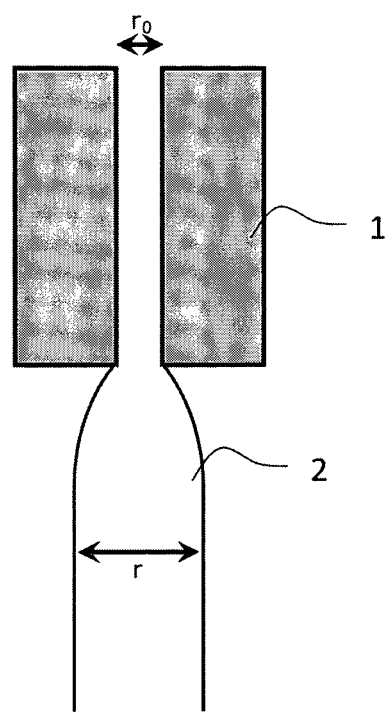

[Figure 2A]
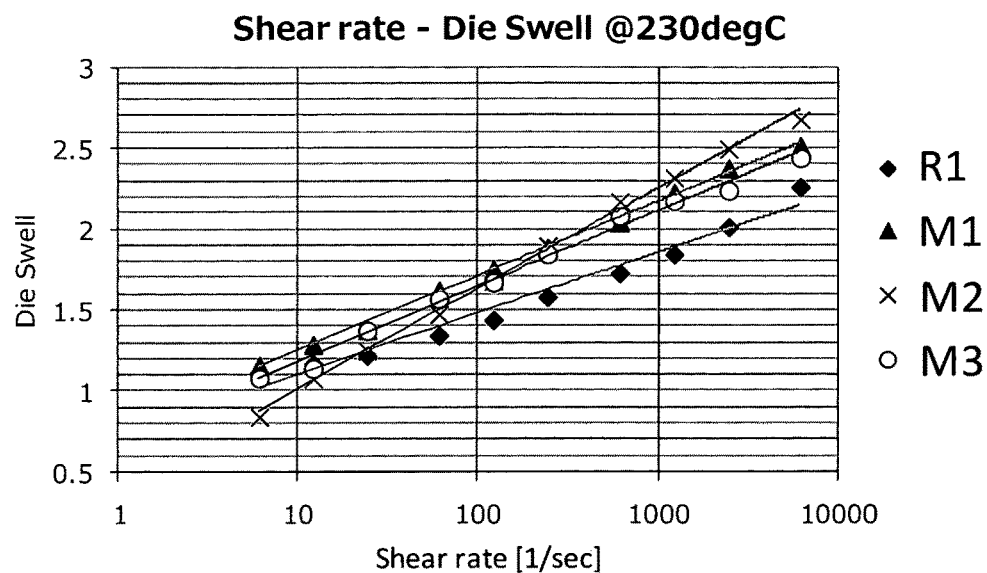
[Figure 2B]
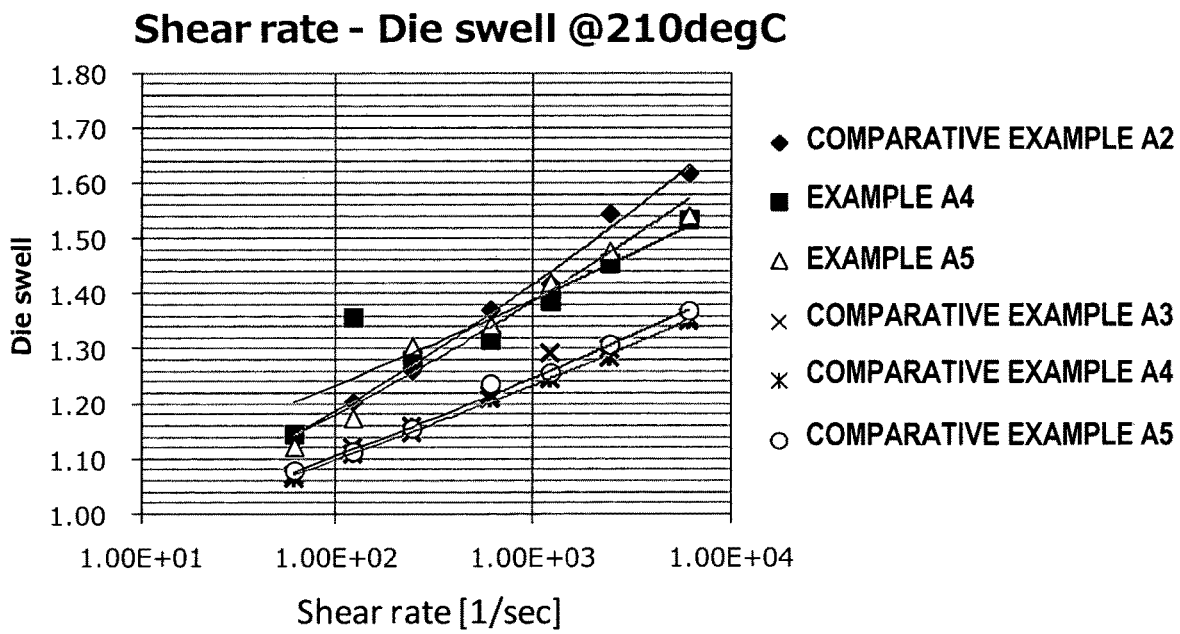

[Figure 3]
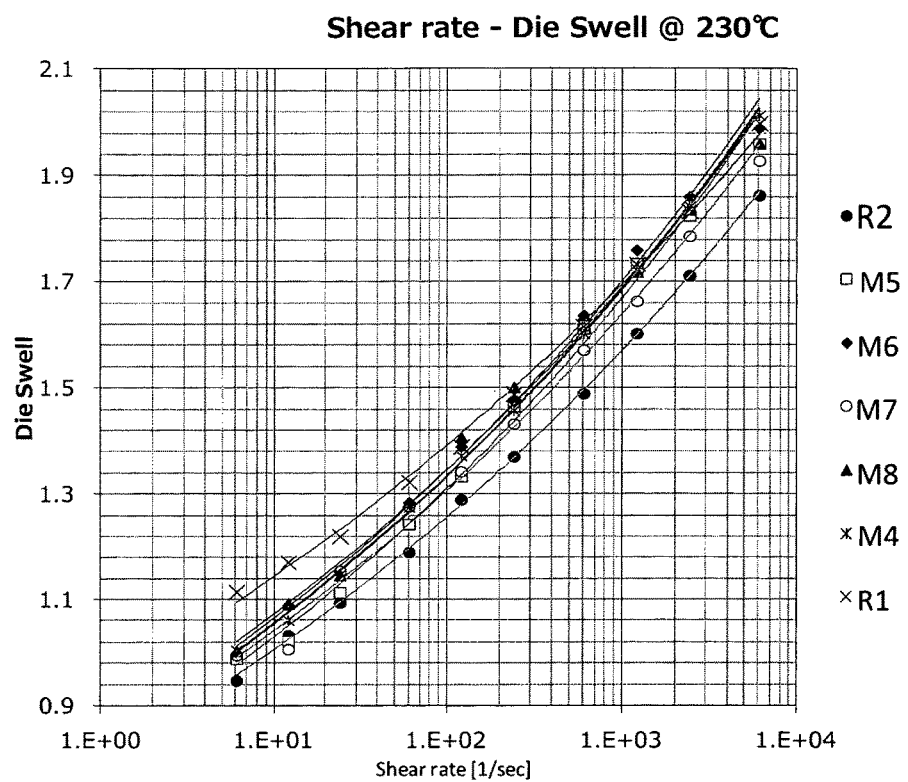
[Figure 4]
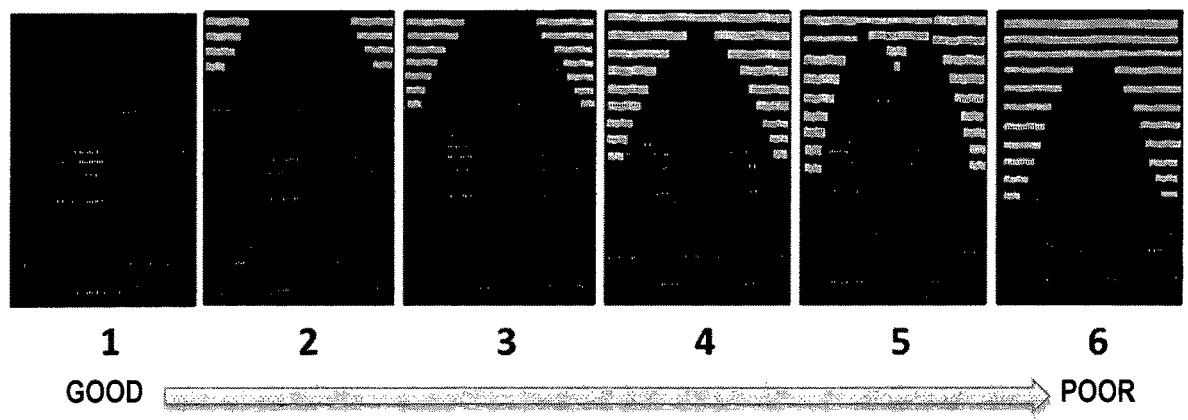

MASTERBATCH COMPOSITION

This application is the U.S. National Phase of PCT International Application PCT/JP2017/046271, filed Dec. 18, 2017, claiming benefit of priority to Japanese Patent Application No. 2016-246290, filed Dec. 20, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a masterbatch composition.

BACKGROUND OF THE INVENTION

In some instances, polypropylene resin compositions are used to make industrial articles such as automobiles. In some instances, polypropylene resin compositions are used for injection molding applications such as automotive bumpers. In some instances, the polypropylene resin compositions have problems such as insufficient fluidity or the formation of defects of surface appearance such as flow marks or seeds.

SUMMARY OF THE INVENTION

In a general embodiment, the present disclosure provides a masterbatch composition made from or containing:
 a propylene homopolymer or copolymer as component (1) containing 0 to 3 wt % of ethylene or one or more C4-C10-α-olefin-derived units; and
 a propylene-ethylene copolymer as component (2) containing 25 to 35 wt % of ethylene-derived units,
 wherein the ratio of component (1) to component (2) is 65 to 85 parts by weight: 15 to 35 parts by weight; and wherein the masterbatch composition has
 1) a melt flow rate (230° C., load: 21.18 N) of 5 to 30 g/10 minutes;
 2) xylene insolubles with an Mw of $10 \times 10^4$ to $30 \times 10^4$ and an Mw/Mn of 6 to 20 as measured by GPC; and
 3) xylene solubles with an intrinsic viscosity of 5.5 to 9.0 dl/g.

[2] In some embodiments, the masterbatch composition has a melt flow rate of 5 to 15 g/10 minutes.

[3] In some embodiments, the xylene insolubles have an Mw/Mn of 7 to 20, alternatively 8 to 20, alternatively 9 to 20.

[4] In some embodiments, the masterbatch composition is made from or contains 67 to 75 wt % of component (1) and 25 to 33 wt % of component (2).

[5] In some embodiments, the content of the ethylene-derived units in the propylene-ethylene copolymer as component (2) is 27 to 33 wt %.

[6] In some embodiments, the xylene solubles have an intrinsic viscosity of 6.0 to 8.0 dl/g.

[7] In some embodiments, the masterbatch composition is obtained by polymerizing propylene and ethylene using a catalyst containing:
 (A) a solid catalyst containing magnesium, titanium, halogen, and an electron donor compound selected from succinate-based compounds;
 (B) an organoaluminum compound; and
 (C) an external electron donor compound.

[8] In a general embodiment, a polypropylene resin composition is obtained by mixing the masterbatch composition with a block polypropylene different from the masterbatch composition, wherein the block polypropylene containing 5 wt % or more of ethylene.

[9] In a general embodiments, an injection-molded article is obtained by injection-molding the polypropylene resin composition.

BRIEF DESCRIPTION OF THE SEVERAL VIEWS OF THE DRAWINGS

FIG. 1 shows a diagram depicting die swell for an extruded resin.

FIG. 2A shows a graph of die swell of masterbatch compositions.

FIG. 2B shows a graph of die swell of polypropylene resin compositions.

FIG. 3 shows a graph of die swell of masterbatch compositions.

FIG. 4 shows reference grades for evaluating flow marks.

DETAILED DESCRIPTION OF THE INVENTION

As used herein, the term "masterbatch composition" refers to a composition made from or containing components (1) and (2) and optionally additives. In some embodiments, the masterbatch composition is used as a mixture with other resins or alone. As used herein, the term "polypropylene resin composition" refers to a resin composition which contains the "masterbatch composition" and a block polypropylene containing 5 wt % or more of ethylene and different from the masterbatch composition, and optionally contains a propylene homopolymer or copolymer containing 0 to 3 wt % of ethylene or one or more C4-C10-α-olefin-derived units, an elastomer, and a filler. As used herein, "X to Y" includes the end values X and Y.

1. Masterbatch composition

In some embodiments, the masterbatch composition is made from or contains:
 Component (1): a propylene homopolymer or copolymer containing 0 to 3 wt % of ethylene or one or more C4-C10-α-olefin-derived units; and
 Component (2): a propylene-ethylene copolymer containing 25 to 35 wt % of ethylene-derived units.

(1) Component (1): Propylene Homopolymer or Copolymer

The propylene homopolymer or copolymer is a propylene homopolymer, or a copolymer of propylene containing more than 0 wt % and 3 wt % or less of ethylene or a C4-C10-α-olefin (hereinafter also referred to as the "comonomer"). In some embodiments, the propylene homopolymer is selected to provide rigidity and heat resistance in the final article. In some embodiments, the propylene copolymer is selected to provide flexibility and impact resistance. A propylene copolymer containing 1.0 wt % of ethylene-derived units is a copolymer having a ratio by weight of ethylene-derived units to propylene-derived units of 1.0: 99.0. This is also the case for other copolymers. The content of comonomer-derived units has an upper limit value of 3 wt % or less, alternatively 2.8 wt % or less, alternatively 2.5 wt % or less. It is believed that if the comonomer-derived content exceeds the upper limit value, rigidity will decrease. It is believed that if the comonomer-derived content is 5.0 wt % or more, production of the polymer will be difficult. In some embodiments, the lower limit value of the content of comonomer-derived units is 0.5 wt % or more, alternatively 1.0 wt % or more. In some embodiments, the comonomer is ethylene or a C4-C6-α-olefin. In some embodiments, the comonomer is ethylene.

(2) Component (2): Propylene-Ethylene Copolymer

The propylene-ethylene copolymer contains 25 to 35 wt % of ethylene-derived units. It is believed that if the content of ethylene-derived units exceeds this range, the impact strength and tensile elongation at room temperature will decrease. It is believed that if the content exceeds the upper limit value, the polypropylene resin composition containing the masterbatch will not provide adequate impact strength and die swell for certain applications. In some embodiments, the upper limit value of the content of ethylene-derived units is 33 wt % or less. In some embodiments, the lower limit value of the content is 27 wt % or more.

(3) Composition Ratio

In some embodiments, the ratio by weight of component (1) to component (2) is (1):(2)=65-85:15-35. It is believed that if the amount of component (2) exceeds this upper limit, the production will be difficult. It is believed that if the amount of component (2) is less than the lower limit, the polypropylene resin composition containing the masterbatch will decrease potential improvements to the surface appearance. In some embodiments, the ratio is 67-75:25-33.

(4) Other Components

In some embodiments, the masterbatch composition further is made from or contains additives. In some embodiments, the additives are selected from the group consisting of an antioxidant, a chlorine catcher, a heat stabilizer, a light stabilizer, an ultraviolet absorber, an internal lubricant, an external lubricant, an anti-blocking agent, an antistatic agent, an anti-fogging agent, a crystal nucleating agent, a flame retardant, a dispersant, a copper inhibitor, a neutralizer, a plasticizer, an anti-foaming agent, a cross-linking agent, a peroxide, an oil extender, and other organic and inorganic pigments.

(5) Characteristics

1) Melt Flow Rate

In some embodiments, the masterbatch composition has a melt flow rate (hereinafter also referred to as "MFR") of 5 to 30 g/10 minutes at 230° C. and a load of 21.18 N. It is believed that if the melt flow rate falls within this range, the resulting material provides fluidity for forming into the polypropylene resin composition. It is believed that if the value of the melt flow rate exceeds the upper limit value, defects of surface appearance tend to form. It is believed that if the value of the melt flow rate falls below the lower limit value, the fluidity of the resulting material will decrease and thereby reduce the processability for forming the polypropylene resin composition. In some instances, the surface appearance of the molded article is adversely affected. In some embodiments, the melt flow rate is 5 to 15 g/10 minutes.

2) Mw and Mw/Mn of XI

In some embodiments, xylene insolubles (XI) have an Mw of $10 \times 10^4$ to $30 \times 10^4$ and an Mw/Mn of 6 to 20 as measured by GPC. It is believed that the xylene insolubles are a crystalline component in the composition. In some embodiments, the Mw is in the range of $10 \times 10^4$ to $30 \times 10^4$, which is defined herein as "relatively low." In some embodiments, the Mw/Mn, as an index of molecular weight distribution, is in the range of 6 to 20, which is defined herein as "wide." It is believed that the described molecular weight and molecular weight distribution affect die swell and fluidity such that the high-molecular-weight component improves die swell while the low-molecular-weight component improves the fluidity. It is believed that if die swell is large, the higher rate at which the molten polymer is brought into contact with the mold at the time of molding promotes surface appearance. In some embodiments, Mw is $12 \times 10^4$ to $28 \times 10^4$. In some embodiments, Mw/Mn is 7 to 20, alternatively 8 to 20, alternatively 9 to 20. The Mw and Mw/Mn of the XI are determined by obtaining a component insoluble in xylene at 25° C., and measuring the component by GPC (gel permeation chromatography).

3) XSIV

It is believed that intrinsic viscosity (IV) of the xylene solubles (XS) represents an index of the molecular weight of a component without crystallinity in the composition. The XSIV is determined by obtaining a component soluble in xylene at 25° C., and measuring the intrinsic viscosity of the component by a routine method. In some embodiments, XSIV is 5.5 to 9.0 dl/g. It is believed that if the XSIV falls within this range, die swell is increased, thereby assisting surface appearance upon molding. In some embodiments, intrinsic viscosity is 6.0 to 8.0 dl/g.

4) Other Physical Properties

In some embodiments, the masterbatch composition has a flexural modulus of 950 to 1500 MPa, alternatively 950 to 1300 MPa.

(6) Production Method

In some embodiments, the masterbatch composition is obtained by a method including the step of polymerizing the raw-material monomer of component (1) and the raw-material monomer of component (2) using a catalyst containing (A) a solid catalyst containing magnesium, titanium, halogen, and a succinate-based compound as an internal electron donor; (B) an organoaluminum compound; and (C) an external electron donor compound.

1) Solid Catalyst (Component A)

In some embodiments, component (A) is prepared by contacting a magnesium compound, a titanium compound, and an electron donor compound with each another. In some embodiments, the titanium compound is a tetravalent titanium compound represented by the formula: $Ti(OR)_gX_{4-g}m$ wherein R is a hydrocarbon group, X is halogen, and $0 \leq g \leq 4$. In some embodiments, the titanium compound is selected from the group consisting of titanium tetrahalides; alkoxytitanium trihalides; alkoxytitanium dihalides; trialkoxytitanium monohalides; and tetraalkoxytitanium. In some embodiments, the titanium tetrahalides are selected from the group consisting of $TiCl_4$, $TiBr_4$, and $TiI_4$. In some embodiments, the alkoxytitanium trihalides are selected from the group consisting of $Ti(OCH_3)Cl_3$, $Ti(OC_2H_5)Cl_3$, $Ti(O_n-C_4H_9)Cl_3$, $Ti(OC_2H_5)Br_3$, and $Ti(OisoC_4H_9)Br_3$. In some embodiments, the alkoxytitanium dihalides are selected from the group consisting of $Ti(OCH_3)_2Cl_2$, $Ti(OC_2H_5)_2Cl_2$, $Ti(O_n-C_4H_9)_2Cl_2$, and $Ti(OC_2H_5)_2Br_2$. In some embodiments, the trialkoxytitanium monohalides are selected from the group consisting of $Ti(OCH_3)_3Cl$, $Ti(OC_2H_5)_3Cl$, $Ti(O_n-C_4H_9)_3Cl$, and $Ti(OC_2H_5)_3Br$. In some embodiments, the tetraalkoxytitaniums are selected from the group consisting of $Ti(OCH_3)_4$, $Ti(OC_2H_5)_4$, and $Ti(O_n-C_4H_9)_4$. In some embodiments, the titanium compounds are halogen-containing titanium compounds. In some embodiments, the titanium compounds are titanium tetrahalides. In some embodiments, the titanium compound is titanium tetrachloride. In some embodiments, the magnesium compound used for the preparation of component (A) include magnesium compounds with a magnesium-carbon bond or a magnesium-hydrogen bond. In some embodiments, the magnesium compound is selected from the group consisting of dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butylethoxymagnesium, ethylbutylmagnesium, and butylmagnesium hydride. In some embodiments, the magnesium compounds are used in the form of complex compounds with organoaluminum or the like. In some embodiments, the magnesium compounds are used in liquid or solid form. In some embodiments, the magnesium compounds are selected from the group consisting of magnesium halides; alkoxymagnesium halides; allyloxymagnesium halides; alkoxymagnesium; allyloxymagnesium; and magnesium carboxylates. In some embodiments, the magnesium halides are selected from the group consisting of magnesium chloride, magnesium bromide, magnesium iodide, and magnesium fluoride. In some embodiments, the alkoxymagnesium halides are selected from the group consisting of methoxymagnesium chloride, ethoxymagnesium chloride, isopropoxymagnesium chloride, butoxymagnesium chloride, and octoxymagnesium chloride. In some embodiments, the allyloxymagnesium halides are selected from the group consisting of phenoxymagnesium chloride and methylphenoxymagnesium chloride. In some embodiments, the alkoxymagnesium is selected from the group consisting of ethoxymagnesium, isopropoxymagnesium, butoxymagnesium, n-octoxymagnesium, and 2-ethylhexoxymagnesium. In some embodiments, the allyloxymagnesium is selected from the group consisting of phenoxymagnesium and dimethylphenoxymagnesium. In some embodiments, the magnesium carboxylates are selected from the group consisting of magnesium laurate and magnesium stearate.

In some embodiments, the electron donor compound used for the preparation of component (A) is referred herein to as an "internal electron donor." In some embodiments, the internal electron donor provides a wide molecular weight distribution. It is believed that in some instances, multi-stage polymerization increases molecular weight distribution. It is also believed that it is difficult to increase the molecular weight distribution when the XI has a low molecular weight. In some embodiments, the internal electron donor increases the molecular weight distribution even though the XI has a low molecular weight.

In some embodiments, the internal electron donors are succinate-based compounds. As used herein, the "succinate-based compounds" refers to diesters of succinic acid or diesters of substituted succinic acid. In some embodiments, the succinate-based compounds are represented by formula (I):

[Formula 1]

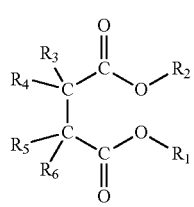

(I)

wherein $R_1$ and $R_2$ groups are the same as or different from each other, and are each a $C_1$-$C_{20}$ straight or branched alkyl, alkenyl, cycloalkyl, aryl, arylalkyl, or alkylaryl group optionally containing heteroatoms; and $R_3$ to $R_6$ groups are the same as or different from each other, and are each a $C_1$-$C_{20}$ straight or branched alkyl, alkenyl, cycloalkyl, aryl, arylalkyl, or alkylaryl group containing hydrogen or optionally containing heteroatoms, and $R_3$ to $R_6$ groups attached to the same or different carbon atoms may be taken together to form a ring.

In some embodiments, $R_1$ and $R_2$ are $C_1$-$C_8$ alkyl, cycloalkyl, aryl, arylalkyl, and alkylaryl groups. In some embodiments, $R_1$ and $R_2$ are selected from primary alkyls, alternatively branched primary alkyls. In some embodiments, $R_1$ and $R_2$ groups are selected from $C_1$-$C_8$ alkyl groups. In some embodiments, the $C_1$-$C_8$ alkyl groups are selected from the group consisting of methyl, ethyl, n-propyl, n-butyl, isobutyl, neopentyl, and 2-ethylhexyl. In some embodiments, the $C_1$-$C_8$ alkyl groups are selected from the group consisting of ethyl, isobutyl, and neopentyl.

In some embodiments, $R_3$ to $R_5$ are hydrogen, and $R_6$ is a branched alkyl, cycloalkyl, aryl, arylalkyl, or alkylaryl group with 3 to 10 carbon atoms. In some embodiments, the monosubstituted succinate compounds are selected from the group consisting of diethyl-sec-butyl succinate, diethyl thexylsuccinate, diethyl cyclopropylsuccinate, diethyl norbornylsuccinate, diethyl perihydrosuccinate, diethyl trimethylsilylsuccinate, diethyl methoxysuccinate, diethyl-p-methoxyphenylsuccinate, diethyl-p-chlorophenylsuccinate, diethyl phenylsuccinate, diethyl cyclohexylsuccinate, diethyl benzylsuccinate, diethyl cyclohexylmethylsuccinate, diethyl-t-butylsuccinate, diethyl isobutylsuccinate, diethyl isopropylsuccinate, diethyl neopentylsuccinate, diethyl isopentylsuccinate, diethyl (1-trifluoromethylethyl)succinate, diethyl fluorenylsuccinate, 1-ethoxycarbo diisobutyl phenylsuccinate, diisobutyl-sec-butylsuccinate, diisobutyl thexylsuccinate, diisobutyl cyclopropylsuccinate, diisobutyl norbornylsuccinate, diisobutyl perihydrosuccinate, diisobutyl trimethylsilylsuccinate, diisobutyl methoxysuccinate, diisobutyl-p-methoxyphenylsuccinate, diisobutyl-p-chlorophenylsuccinate, diisobutyl cyclohexylsuccinate, diisobutyl benzylsuccinate, diisobutyl cyclohexylmethylsuccinate, diisobutyl-t-butylsuccinate, diisobutyl isobutylsuccinate, diisobutyl isopropylsuccinate, diisobutyl neopentylsuccinate, diisobutyl isopentylsuccinate, diisobutyl (1-trifluoromethylethyl)succinate, diisobutyl fluorenylsuccinate, dineopentyl-sec-butyl-succinate, dineopentyl thexylsuccinate, dineopentyl cyclopropylsuccinate, dineopentyl norbornylsuccinate, dineopentyl perihydrosuccinate, dineopentyl trimethylsilylsuccinate, dineopentyl methoxysuccinate, dineopentyl-p-methoxyphenylsuccinate, dineopentyl-p-chlorophenylsuccinate, dineopentyl phenylsuccinate, dineopentyl cyclohexylsuccinate, dineopentyl benzylsuccinate, dineopentyl cyclohexylmethylsuccinate, dineopentyl-t-butylsuccinate, dineopentyl isobutylsuccinate, dineopentyl isopropylsuccinate, dineopentyl neopentylsuccinate, dineopentyl isopentylsuccinate, dineopentyl (1-trifluoromethylethyl) succinate, and dineopentyl fluorenylsuccinate.

In some embodiments, at least two groups from $R_3$ to $R_6$ are different from hydrogen, and are selected from $C_1$-$C_{20}$ linear or branched alkyl, alkenyl, cycloalkyl, aryl, arylalkyl, and alkylaryl groups optionally containing heteroatoms. In some embodiments, the two groups different from hydrogen are attached to the same carbon atom. In some embodiments, $R_3$ and $R_4$ are groups different from hydrogen, and $R_5$ and $R_6$ are hydrogen atoms. In some embodiments, the disubstituted succinates are selected from the group consisting of diethyl-2,2-dimethylsuccinate, diethyl-2-ethyl-2-methylsuccinate, diethyl-2-benzyl-2-isopropylsuccinate, diethyl-2-cyclohexylmethyl-2-isobutylsuccinate, diethyl-2-cyclopentyl-2-n-butylsuccinate, diethyl-2,2-diisobutylsuccinate, diethyl-2-cyclohexyl-2-ethylsuccinate, diethyl-2-isopropyl-2- methylsuccinate, diethyl-2-tetradecyl-2-ethylsuccinate, diethyl-2-isobutyl-2-ethylsuccinate, diethyl-2-(1-trifluoromethylethyl)-2-methylsuccinate, diethyl-2-isopentyl-2-isobutylsuccinate, diethyl-2-phenyl-2-n-butylsuccinate, diisobutyl-2,2-dimethylsuccinate, diisobutyl-2-ethyl-2-methylsuccinate, diisobutyl-2-benzyl-2-isopropylsuccinate, diisobutyl-2-cyclohexylmethyl-2-isobutylsuccinate, diisobutyl-2-cyclopentyl-2-n-butylsuccinate, diisobutyl-2,2-diisobutylsuccinate, diisobutyl-2-cyclohexyl-2-ethylsuccinate, diisobutyl-2-isopropyl-2-methylsuccinate, diisobutyl-2-tetradecyl-2-ethylsuccinate, diisobutyl-2-isobutyl-2-ethylsuccinate, diisobutyl-2-(1-trifluoromethylethyl)-2-methylsuccinate, diisobutyl-2-isopentyl-2-isobutylsuccinate, diisobutyl-2-phenyl-2-n-butylsuccinate, dineopentyl-2,2-dimethylsuccinate, dineopentyl-2-ethyl-2-methylsuccinate, dineopentyl-2-benzyl-2-isopropylsuccinate, dineopentyl-2-cyclohexylmethyl-2-isobutylsuccinate, dineopentyl-2-cyclopentyl-2-n-butylsuccinate, dineopentyl-2,2-diisobutylsuccinate, dineopentyl-2-cyclohexyl-2-ethylsuccinate, dineopentyl-2-isopropyl-2-methylsuccinate, dineopentyl-2-tetradecyl-2-ethylsuccinate, dineopentyl-2-isobutyl-2-ethylsuccinate, dineopentyl-2-(1-trifluoromethylethyl)-2-methylsuccinate, dineopentyl-2-isopentyl-2-isobutylsuccinate, and dineopentyl-2-phenyl-2-n-butylsuccinate.

In some embodiments, at least two groups different from hydrogen are attached to different carbon atoms. In some embodiments, $R_3$ and $R_5$ are groups different from hydrogen. In some embodiments, while $R_4$ and $R_6$ are hydrogen atoms or groups different from hydrogen, an $R_4$ or $R_6$ is a hydrogen atom (trisubstituted succinates). In some embodiments, the compounds are selected from the group consisting of diethyl-2,3-bis(trimethylsilyl)succinate, diethyl-2,2-sec-butyl-3-methylsuccinate, diethyl-2-(3,3,3-trifluoropropyl)-3-methylsuccinate, diethyl-2,3-bis(2-ethylbutyl)succinate, diethyl-2,3-diethyl-2-isopropylsuccinate, diethyl-2,3-diisopropyl-2-methylsuccinate, diethyl-2,3-dicyclohexyl-2-methyldiethyl-2,3-dibenzylsuccinate, diethyl-2,3-diisopropylsuccinate, diethyl-2,3-bis(cyclohexylmethyl)succinate, diethyl-2,3-di-t-butylsuccinate, diethyl-2,3-diisobutylsuccinate, diethyl-2,3-dineopentylsuccinate, diethyl-2,3-diisopentylsuccinate, diethyl-2,3-(1-trifluoromethylethyl)succinate, diethyl-2,3-tetradecylsuccinate, diethyl-2,3-fluorenylsuccinate, diethyl-2-isopropyl-3-isobutylsuccinate, diethyl-2-tert-butyl-3-isopropylsuccinate, diethyl-2-isopropyl-3-cyclohexylsuccinate, diethyl-2-isopentyl-3-cyclohexylsuccinate, diethyl-2-tetradecyl-3-cyclohexylmethylsuccinate, diethyl-2-cyclohexyl-3-cyclopentylsuccinate, diisobutyl-2,3-diethyl-2-isopropylsuccinate, diisobutyl-2,3-diisopropyl-2-methylsuccinate, diisobutyl-2,3-dicyclohexyl-2-methylsuccinate, diisobutyl-2,3-dibenzylsuccinate, diisobutyl-2,3-diisopropylsuccinate, diisobutyl-2,3-bis(cyclohexylmethyl)succinate, diisobutyl-2,3-di-t-butylsuccinate, diisobutyl-2,3-diisobutylsuccinate, diisobutyl-2,3-dineopentylsuccinate, diisobutyl-2,3-diisopentylsuccinate, diisobutyl-2,3-(1-trifluoromethylethyl) succinate, diisobutyl-2,3-tetradecylsuccinate, diisobutyl-2,3-fluorenylsuccinate, diisobutyl-2-isopropyl-3-isobutylsuccinate, diisobutyl-2-tert-butyl-3-isopropylsuccinate, diisobutyl-2-isopropyl-3-cyclohexylsuccinate, diisobutyl-2-isopentyl-3-cyclohexylsuccinate, diisobutyl-2-tetradecyl-3-cyclohexylmethylsuccinate, diisobutyl-2-cyclohexyl-3-cyclopentylsuccinate, dineopentyl-2,3-bis(trimethylsilyl)succinate, dineopentyl-2,2-sec-butyl-3-methylsuccinate, dineopentyl-2-(3,3,3-trifluoropropyl)-3-methylsuccinate, dineopentyl-2,3-bis(2-ethylbutyl)succinate, dineopentyl-2,3-diethyl-2-isopropylsuccinate, dineopentyl-2,3-diisopropyl-2-methylsuccinate, dineopentyl-2,3-dicyclohexyl-2-methylsuccinate, dineopentyl-2,3-dibenzylsuccinate, dineopentyl-2,3-diisopropylsuccinate, dineopentyl-2,3-bis(cyclohexylmethyl)succinate, dineopentyl-2,3-di-t-butylsuccinate, dineopentyl-2,3-diisobutylsuccinate, dineopentyl-2,3-dineopentylsuccinate, dineopentyl-2,3-diisopentylsuccinate, dineopentyl-2,3-(1-trifluoromethylethyl) succinate, dineopentyl-2,3-tetradecylsuccinate, dineopentyl-2,3-fluorenylsuccinate, dineopentyl-2-isopropyl-3-isobutylsuccinate, dineopentyl-2-tert-butyl-3-isopropylsuccinate, dineopentyl-2-isopropyl-3-cyclohexylsuccinate, dineopentyl-2-isopentyl-3-cyclohexylsuccinate, dineopentyl-2-tetradecyl-3-cyuclohexylmethylsuccinate, and dineopentyl-2-cyclohexyl-3-cyclopentylsuccinate.

In some embodiments, some of $R_3$ to $R_6$ groups are taken together to form a ring. In some embodiments, the compounds are as described in National Publication of International Patent Application No. 2002-542347. In some embodiments, the compounds are selected from the group consisting of 1-(ethoxycarbonyl)-1-(ethoxyacetyl)-2,6-dimethylcyclohexane, 1-(ethoxycarbonyl)-1-(ethoxyacetyl)-2,5-dimethylcyclopentane, 1-(ethoxycarbonyl)-1-(ethoxyacetylmethyl)-2-methylcyclohexane, and 1-(ethoxycarbonyl)-1-(ethoxy(cyclohexyl)acetyl)cyclohexane. In some embodiments, the cyclic succinate compounds are as disclosed in International Publication No. WO2009/069483. In some embodiments, the cyclic succinate compounds are selected from the group consisting of diisobutyl 3,6-dimethylcyclohexane-1,2-dicarboxylate and diisobutyl cyclohexane-1,2-dicarboxylate. In some embodiments, cyclic succinate compounds are as disclosed in International Publication No. WO2009/057747.

In some embodiments, $R_3$ to $R_6$ groups contain heteroatoms selected from the group consisting of atoms of group 15 including nitrogen and phosphorus atoms or atoms of group 16 including oxygen and sulfur atoms. In some embodiments, the compounds wherein $R_3$ to $R_6$ groups contain atoms of group 15 are as disclosed in Japanese Patent Laid-Open No. 2005-306910. In some embodiments, the compounds wherein $R_3$ to $R_6$ groups contain atoms of group 16 are as disclosed in Japanese Patent Laid-Open No. 2004-131537.

In some embodiments, internal electron donors that provide a molecular weight distribution equivalent to that obtained with the succinate-based compounds are used. In some embodiments, the internal electron donors include biphenyldicarboxylic acid esters as described in Japanese Patent Laid-Open No. 2013-28704, cyclohexene dicarboxylic acid esters as described in Japanese Patent Laid-Open No. 2014-201602, dicycloalkyl dicarboxylic acid esters as described in Japanese Patent Laid-Open No. 2013-28705, diol dibenzoate as described in Japanese Patent No. 4959920, and 1,2-phenylene dibenzoate as described in International Publication No. WO2010/078494.

2) Organoaluminum Compound (Component B)

In some embodiments, the organoaluminum compounds as components (B) are selected from the group consisting of
    trialkylaluminum;
    trialkenylaluminum;
    dialkylaluminum alkoxides;
    alkylaluminum sesquialkoxides;
    partially halogenated alkylaluminum;
    dialkylaluminum hydrides; and
    partially alkoxylated and halogenated alkylaluminum. In some embodiments, the trialkylaluminum is selected from the group consisting of triethylaluminum and tributylaluminum. In some embodiments, the trialkenylaluminum is triisoprenylaluminum. In some embodiments, the dialkylaluminum alkoxides are selected from the group consisting of diethylaluminum ethoxide and dibutylaluminum butoxide. In some embodiments, the alkylaluminum sesquialkoxides are selected from the group consisting of ethylaluminum sesquiethoxide and butylaluminum sesquibutoxide. In some embodiments, the partially halogenated alkylaluminum is selected from the group consisting of alkylaluminum dihalogenides and alkylaluminum dihydrides. In some embodiments, the alkylaluminum dihalogenide is selected from the group consisting of ethylaluminum dichloride, propylaluminum dichloride, and butylaluminum dibromide. In some embodiments, the alkylaluminum dihydrides are selected from the group consisting of ethylaluminum dihydride and propylaluminum dihydride. In some embodiments, the dialkylaluminum hydrides are selected from the group consisting of diethylaluminum hydride and dibutylaluminum hydride. In some embodiments, the partially alkoxylated and halogenated alkylaluminum is selected from the group consisting of ethylaluminum ethoxychloride, butylaluminum butoxychloride, and ethylaluminum ethoxybromide.

3) Electron Donor Compound (Component C)

As used herein, the electron donor compound as component (C) is referred to as an "external electron donor." In some embodiments, an organosilicon compound is an electron donor compound. In some embodiments, the organosilicon compounds are selected from the group consisting of: trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bis-ethylphenyldimethoxysilane, dicyclopentyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, thexyltrimethoxysilane, n-butyltriethoxysilane, isobutyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyloxysilane, vinyltris(β-methoxyethoxysilane), vinyltriacetoxysilane, and dimethyltetraethoxydisiloxane.

In some embodiments, the organosilicon compounds are selected from the group consisting of ethyltriethoxysilane, n-propyltriethoxysilane, n-propyltrimethoxysilane, t-butyltriethoxysilane, t-butylmethyldimethoxysilane, t-butylmethyldiethoxysilane, t-butylethyldimethoxysilane, t-butylpropyldimethoxysilane, t-butyl-t-butoxydimethoxysilane, t-butyltrimethoxysilane, i-butyltrimethoxysilane, isobutylmethyldimethoxysilane, i-butyl-sec-butyldimethoxysilane, ethyl(perhydroisoquinolin-2-yl) dimethoxysilane, bis(decahydroisoquinolin-2-yl) dimethoxysilane, tri(isopropenyloxy)phenylsilane, thexyltrimethoxysilane, vinyltriethoxysilane, phenyltriethoxysilane, phenyltrimethoxysilane, vinyltributoxysilane, diphenyldimethoxysilane, diisopropyldimethoxysilane, diisobutyldimethoxysilane, i-butyl-i-propyldimethoxysilane, cyclopentyl-t-butoxydimethoxysilane, dicyclopentyldimethoxysilane, cyclohexylmethyldimethoxysilane, cyclohexyl-i-butyldimethoxysilane, cyclopentyl-i-butyldimethoxysilane, cyclopentylisopropyldimethoxysilane, di-sec-butyldimethoxysilane, diethylaminotriethoxysilane, tetraethoxysilane, tetramethoxysilane, isobutyltriethoxysilane, phenylmethyldimethoxysilane, phenyltriethoxysilane, bis-p-tolyldimethoxysilane, p-tolylmethyldimethoxysilane, dicyclohexyldimethoxysilane, cyclohexylethyldimethoxysilane, 2-norbornanetriethoxysilane, 2-norbornanemethyldimethoxysilane, diphenyldiethoxysilane, methyl(3,3,3-trifluoropropyl)dimethoxysilane, ethyl silicate, and the like.

4) Polymerization

The raw-material monomers are polymerized by contact with the catalyst. In some embodiments, pre-polymerization is performed initially with the catalyst. Pre-polymerization is a step of forming the polymer chain, which will be the scaffold of subsequent permanent polymerization of the raw-material monomers, on the solid catalyst component. In some embodiments, pre-polymerization is performed at 40° C. or lower, alternatively 30° C. or lower, alternatively 20° C. or lower.

Next, the preliminarily polymerized catalyst is introduced into the polymerization reaction system to permanently polymerize the raw-material monomers. In some embodiments, permanent polymerization is performed by polymerizing the raw-material monomer of component (1) and the raw-material monomer of component (2), using two or more reactors. In some embodiments, polymerization is carried out in the liquid phase, gas phase, or liquid-gas phase. In some embodiments, the polymerization temperature is from normal temperature to 150° C., alternatively 40° C. to 100° C. In some embodiments, the polymerization pressure ranges from 33 to 45 bar for polymerization in the liquid phase, alternatively from 5 to 30 bar for polymerization in the gas phase. In some embodiments, a molecular weight regulator such as a chain transfer agent is used. In some embodiments, the chain transfer agent is hydrogen or $ZnEt_2$.

In some embodiments, a polymerization apparatus having a gradient in monomer concentration or polymerization conditions is used. In some embodiments, the monomers are polymerized in the gas phase using an apparatus having at least two interconnected polymerization zones. In some embodiments, in the presence of a catalyst, the monomers are fed to a polymerization zone constituted by a riser and polymerized, and the monomers are fed to a downcomer connected to the riser and polymerized, and then the polymer product is collected while being circulated between the riser and downcomer. In some embodiments, the gas mixture present in the riser is totally or partially prevented from entering the downcomer. In some embodiments, a gas and/or liquid mixture of a composition different from that of the gas mixture present in the riser is introduced into the downcomer. In some embodiments, the method is as described in National Publication of International Patent Application No. 2002-520426.

2. Polypropylene Resin Composition

In some embodiments, the polypropylene resin composition is obtained by mixing the masterbatch composition with block polypropylene containing 5 wt % or more of ethylene and different from the masterbatch composition (hereinafter also referred to as "essential block polypropylene"). In some embodiments, the polypropylene resin composition contains optional components.

(1) Essential Block Polypropylene

In some embodiments, the essential block polypropylene is a polymeric mixture (also referred to as an HECO, hetero-phasic copolymer) obtained by polymerizing ethylene and one or more C3-C10-α-olefins in the presence of a propylene polymer. The masterbatch composition is also a kind of HECO. In some embodiments, the essential block polypropylene is produced using a method similar to that for the masterbatch composition. The masterbatch composition and the essential block polypropylene, however, differ in composition.

(2) Optional Components

1) Optional Propylene (Co)Polymer

In some embodiments, an optional component is a polymer containing 0 to 3 wt % of ethylene or one or more C4-C10-α-olefins (also referred to as the "optional propylene (co)polymer"). In some embodiments, the optional propylene homopolymer or copolymer is the same as or different from component (1). In some embodiments, the polymer is propylene homopolymer.

2) Elastomer

An elastomer is a polymer with elasticity. In some embodiments, and elastomer is added to improve the impact resistance of a material. In some embodiments, the elastomer is a copolymer of ethylene and an α-olefin. In some embodiments, the α-olefins include α-olefins with 3 to 12 carbon atoms. In some embodiments, the α-olefins are selected from the group consisting of propylene, 1-butene, 1-pentene, 1-hexene, 1-octene, and the like. In some embodiments, the elastomer has a density lower than the densities of the polymers of components (1) and (2). In some embodiments, the density of the elastomer is 0.850 to 0.890 g/cm$^3$, alternatively 0.860 to 0.880 g/cm$^3$. In some embodiments, an elastomer is prepared by polymerizing the monomers using a homogeneous catalyst. In some embodiments, the homogeneous catalyst is a metallocene or half-metallocene. In some embodiments, the metallocene or half-metallocene is described in Japanese Patent Laid-Open No. 2015-113363. In some embodiments, the elastomer has an MFR of 0.1 to 50 g/10 minutes at 190° C. and a load of 21.6 N.

3) Filler

In some embodiments, a filler is added to improve the rigidity of a material. In some embodiments, fillers are selected from the group consisting of inorganic fillers and organic fillers. In some embodiments, the inorganic fillers are selected from the group consisting of talc, clay, calcium carbonate, magnesium hydroxide, and glass fiber. In some embodiments, the organic fillers are selected from the group consisting of carbon fiber and cellulose fiber. In some embodiments and to improve the dispersibility of these fillers, the filler is surface-treated or a masterbatch of the filler with a resin is prepared. In some embodiments, the filler is talc. Talc is believed to be readily miscible with the propylene homopolymer or copolymer and the copolymer of ethylene and an α-olefin.

4) Other Components

In some embodiments, the polypropylene resin composition further contain additives. In some embodiments, the additives are selected from the group consisting of an antioxidant, a chlorine catcher, a heat stabilizer, a light stabilizer, an ultraviolet absorber, an internal lubricant, an external lubricant, an anti-blocking agent, an anti-static agent, an anti-fogging agent, a crystal nucleating agent, a flame retardant, a dispersant, a copper inhibitor, a neutralizer, a plasticizer, an anti-foaming agent, a cross-linking agent, a peroxide, an oil extender, and other organic and inorganic pigments.

(3) Composition Ratio

In some embodiments, the ratio by weight of the masterbatch composition to the essential block polypropylene to be blended is "2-70":"98-30." In some embodiments, the amounts of the optional components to be blended are propylene homopolymer or copolymer is 0 to 100 parts by weight, the elastomer is 0 to 100 parts by weight, and the filler is 0 to 100 parts by weight, based on a total amount of 100 parts by weight of the masterbatch composition and the essential block polypropylene.

(4) Production Method

In some embodiments, the polypropylene resin composition is produced by melt-kneading the components. In some embodiments, a kneader such as an extruder is used. In some embodiments, the cylinder temperature is 180 to 250° C. In some embodiments, the polypropylene resin composition is obtained in the form of pellets. In some embodiments, the polypropylene resin composition is produced as a molded article, by weighing a dry blend of the components into an injection molding machine, and kneading the components in a melt-kneading part (cylinder). In this manner, the polypropylene resin composition is obtained by mixing the masterbatch composition with the other components. The propylene-ethylene copolymer component of the masterbatch composition is dispersed in a matrix containing the propylene homopolymer or copolymer as a main component to form the phase structure.

(5) Injection Molding

In some embodiments, the polypropylene resin composition is used in injection molding. In some embodiments, the polypropylene resin composition is used for large-size molded articles such as automotive parts and home appliance products. In some embodiments, the injection conditions are as follows: a cylinder temperature of 200 to 230° C., a mold temperature of 20 to 50° C., and an injection speed of 30 to 50 mm/second.

EXAMPLES

1. Production of Masterbatch Compositions (No. 1)

Example A1

Production of Masterbatch Composition M1

A solid catalyst component was prepared based on the Examples of National Publication of International Patent Application No. 2011-500907. Specifically, the solid catalyst component was prepared as follows.

In a 500 mL four-neck round bottom flask purged with nitrogen, 250 mL of TiCl$_4$ was introduced at 0° C. Under stirring, 10.0 g of MgCl$_2$.1.8C$_2$H$_5$OH as microspheres (produced in accordance with the method described in Example 2 of U.S. Pat. No. 4,399,054; however, the operation was performed at 3000 rpm instead of 10000 rpm) and 9.1 millimoles of diethyl-2,3-(diisopropyl)succinate were added. The temperature was elevated to 100° C. and maintained for 120 minutes. Next, stirring was stopped, the solid product was allowed to settle, and the supernatant liquid was siphoned off. Then, the following operations were repeated twice: 250 mL of fresh TiCl$_4$ was added, the mixture was reacted at 120° C. for 60 minutes, and the supernatant liquid was siphoned off. The solid was washed six times with anhydrous hexane (6×100 mL) at 60° C.

The solid catalyst was contacted with triethylaluminum (TEAL) and dicyclopentyldimethoxysilane (DCPMS) at room temperature for 5 minutes, in amounts such that the ratio by weight of TEAL to the solid catalyst became 18, and the TEAL/DCPMS ratio by weight became 10. Pre-polymerization was performed by maintaining the catalyst system in liquid propylene in a suspended state at 20° C. for 5 minutes.

The pre-polymer was introduced into a first-stage polymerization reactor to obtain a propylene homopolymer, and thereafter, the polymer was purged of unreacted monomers, and then introduced into a second-stage polymerization reactor to polymerize a copolymer (ethylene-propylene copolymer). During polymerization, the temperature and pressure were adjusted, and hydrogen was used as a molecular weight regulator. The polymerization temperature and the ratio of the reactants were as follows: in the first-stage reactor, the polymerization temperature was 70° C., and the hydrogen concentration was 0.82 mol %; in the second-stage reactor, the polymerization temperature was 80° C., the hydrogen concentration was 100 molar ppm, and C2/(C2+C3) was 0.22 by molar ratio. Further, the residence time distribution in the first and second stages was adjusted such that the amount of the copolymer component became 28 wt %.

Powder of masterbatch composition M1 was blended with 0.2 wt % of B225 from BASF SE as an antioxidant and 0.05 wt % of calcium stearate from Tannan Kagaku Kogyo Co., Ltd. as a neutralizer, stirred and mixed in a Henschel mixer for 1 minute, and thereafter, the mixture was melt-kneaded at a cylinder temperature of 200° C. and extruded, using a single-screw extruder having a screw diameter of 50 mm (model number: NVC-50 from Nakatani Kikai Co., Ltd.). The strands were cooled in water and then cut with a pelletizer to obtain pellets. The pellets were injection-molded into various specimens, using an injection molding machine (model number: Roboshot S-2000i 100B from Fanuc Corporation). The molding conditions were as follows: a cylinder temperature of 200° C., a mold temperature of 40° C., and an injection speed of 200 mm/second.

Example A2

Production of Masterbatch Composition M2

The masterbatch composition was produced as in Example A1, except that the hydrogen concentration in the first-stage reactor was changed to 0.84 mol %, and the residence time distribution in the first and second stages was adjusted such that the amount of the copolymer component became 31 wt %.

Example A3

Production of Masterbatch Composition M3

Masterbatch composition M3 was produced as in Example A1, except that the hydrogen concentration in the first-stage reactor was changed to 0.87 mol %, C2/(C2+C3) in the second-stage reactor was changed to 0.23 by molar ratio, and the residence time distribution in the first and second stages was adjusted such that the amount of the copolymer component became 32 wt %.

Comparative Example A1

Production of Comparative Masterbatch Compositions R1, XL-1, XL-2, and XL-3

R1 was produced as in Example A1, except that the hydrogen concentration in the first-stage reactor was changed to 0.24 mol %, the hydrogen concentration and C2/(C2+C3) in the second-stage reactor were changed to 150 molar ppm and 0.27 by molar ratio, respectively, and the residence time distribution in the first and second stages was adjusted such that the amount of the copolymer component became 30 wt %.

XL-1 was produced as in Example A1, except that the hydrogen concentration in the first-stage reactor was changed to 0.51 mol %, the hydrogen concentration and C2/(C2+C3) in the second-stage reactor were changed to 50 molar ppm and 0.50 by molar ratio, respectively, and the residence time distribution in the first and second stages was adjusted such that the amount of the copolymer component became 30 wt %.

XL-2 was produced as in Example A1, except that the hydrogen concentration in the first-stage reactor was changed to 0.59 mol %, the hydrogen concentration and C2/(C2+C3) in the second-stage reactor were changed to 50 molar ppm and 0.49 by molar ratio, respectively, and the residence time distribution in the first and second stages was adjusted such that the amount of the copolymer component became 30 wt %.

XL-3 was produced as in Example A1, except that the hydrogen concentration in the first-stage reactor was changed to 0.81 mol %, the hydrogen concentration and C2/(C2+C3) in the second-stage reactor were changed to 0 molar ppm and 0.48 by molar ratio, respectively, and the residence time distribution in the first and second stages was adjusted such that the amount of the copolymer component became 30 wt %.

2. Production of Polypropylene Resin Compositions (No. 1)

[1] Propylene Homopolymer HOMO1

A propylene homopolymer having an MFR of 1750 g/10 minutes and a content of xylene solubles at 25° C. of 2.3 wt % was used.

[2] Propylene Homopolymer HOMO2

A propylene homopolymer having an MFR of 70 g/10 minutes and a content of xylene solubles at 25° C. of 1.5 wt % was used.

[3] Block Polypropylene HECO1

Block polypropylene made from or containing a polypropylene homopolymer and an ethylene-propylene copolymer was prepared based on the stepwise polymerization method described in paragraph 0035 of Japanese Patent Laid-Open No. 2015-113363. The block polypropylene had the following characteristics:

The polypropylene homopolymer: MFR=210 g/10 minutes; content of xylene solubles at 25° C.=2.0 wt %

The block polypropylene: MFR=37 g/10 minutes; intrinsic viscosity of xylene solubles at 25° C.=2.4 dl/g The proportion of the ethylene-propylene copolymer contained in the block polypropylene=30 wt %

The proportion of ethylene units contained in the ethylene-propylene copolymer=27.5 wt %

[4] Block Polypropylene HECO2

Block polypropylene made from or containing a polypropylene homopolymer and an ethylene-propylene copolymer was prepared based on the stepwise polymerization method described in paragraph 0035 of Japanese Patent Laid-Open No. 2015-113363. The block polypropylene had the following characteristics:

The polypropylene homopolymer: MFR=120 g/10 minutes; content of xylene solubles at 25° C.=1.9 wt %

The block polypropylene: MFR=25 g/10 minutes; intrinsic viscosity of xylene solubles at 25° C.=2.4 dl/g The proportion of an ethylene-1-butene copolymer contained in the block polypropylene=27 wt %

The proportion of ethylene units contained in the ethylene-1-butene copolymer=75 wt %

[5] Elastomers C2C8-1 and C2C8-2

Two ethylene-octene copolymers polymerized using a metallocene-based catalyst were used.

C2C8-1 (multiblock copolymer): density=0.870 g/cm$^3$; MFR at 190° C. and a load of 21.6 N=0.5 g/10 minutes C2C8-2: density=0.870 g/cm$^3$; MFR at 190° C. and a load of 21.6 N=1 g/10 minutes Example A4

Production of a Polypropylene Resin Composition

Masterbatch composition M2 obtained in Example A2, HOMO1, HOMO2, HECO1, HECO2, elastomers C2C8-1 and C2C8-2, and talc (HTP05L from IMI Fabi, LLC) were blended as shown in Table 2, the mixture was further blended with the following amounts of additives based on a total amount of 100 parts by weight of the resin, and the blend of these components was melt-kneaded at a die set temperature of 220° C., using a twin-screw extruder (model number: TEX30α from the Japan Steel Works, Ltd.) to obtain pellets.

[Additives]

Antioxidant: 0.2 parts by weight of pentaerythritol tetrakis[3-(3,5-di-tert-butyl-4-hydroxyphenyl)propionate]

Weathering agent: 0.2 parts by weight of bis(1,2,2,6,6-tetramethyl-4-piperidyl) sebacate Slip agent: 0.1 parts by weight of magnesium stearate The pellets were injection-molded into various specimens, using an injection molding machine (model number: Roboshot S-2000i 100B from Fanuc Corporation). The molding conditions were as follows: a cylinder temperature of 200° C., a mold temperature of 40° C., and an injection speed of 200 mm/second.

Example A5

Production of a Polypropylene Resin Composition

A polypropylene resin composition was produced as in Example A4, except that masterbatch composition M3 was used instead of masterbatch composition M2, and the amounts of HOMO1 and HOMO2 were as shown in Table 2.

Comparative Example A2

Production of a Comparative Polypropylene Resin Composition

A comparative polypropylene resin composition was produced as in Example A4, except that masterbatch composition R1 produced in Comparative Example A1 was used instead of masterbatch composition M2, and the amounts of HOMO1 and HOMO2 were as shown in Table 2.

Comparative Example A3

Production of a Comparative Polypropylene Resin Composition

Comparative masterbatch composition XL-1 was prepared. XL-1 was a masterbatch composition made from or containing a propylene homopolymer as component (1) and a propylene-ethylene copolymer component as component (2), and the content of ethylene-derived units in component (2) exceeded 35 wt %, and the MFR was less than 5 g/10 minutes. XL-1, the propylene homopolymers or copolymers described in [1] to [4], the elastomers, and talc were blended as shown in Table 2, and the comparative polypropylene resin composition was produced as in Example A4.

Comparative Example A4

Production of a Comparative Polypropylene Resin Composition

A comparative polypropylene resin composition was produced as in Comparative Example A3, except that comparative masterbatch composition XL-2 was used instead of XL-1. XL-2 was a masterbatch composition made from or containing a propylene homopolymer as component (1) and a propylene-ethylene copolymer component as component (2), and the content of ethylene-derived units in component (2) exceeded 35 wt %.

Comparative Example A5

Production of a Comparative Polypropylene Resin Composition

A comparative polypropylene resin composition was produced as in Comparative Example A3, except that comparative masterbatch composition XL-3 was used instead of XL-1, and the polypropylene resin composition was evaluated. XL-3 was a masterbatch composition composed of a propylene homopolymer as component (1) and a propylene-ethylene copolymer component as component (2), and the content of ethylene-derived units in component (2) exceeded 35 wt %.

TABLE 1

Composition and Physical Properties of Masterbatch Composition

| | | | | Example A1 | Example A2 | Example A3 | Comparative Example A1 | | | |
|---|---|---|---|---|---|---|---|---|---|---|
| | Name of Masterbatch Composition | | | M1 | M2 | M3 | R1 | XL-1 | XL-2 | XL-3 |
| Composition | Component (1) | | wt % | 72.3 | 69.0 | 68.0 | 70.0 | 70.0 | 70.0 | 70.0 |
| | Component (2) | | wt % | 27.7 | 31.0 | 32.0 | 30.0 | 30.0 | 30.0 | 30.0 |
| | Et Units in Component (2) | | wt % | 27.4 | 27.1 | 28.2 | 32.0 | 54.9 | 54.0 | 53.3 |
| Physical Properties | Matrix (Component (1)) | MFR | g/10 min | 105 | 115 | 117 | 9.0 | 36.3 | 56.4 | 99 |
| | Composition | MFR | g/10 min | 11 | 10 | 9.0 | 1.0 | 3.6 | 5.8 | 6.7 |
| | | XS | wt % | 25.3 | 24.4 | 25.8 | 24.0 | 23.7 | 25.5 | 24.5 |
| | | XSIV | dl/g | 7.1 | 7.3 | 7.2 | 6.5 | 8.2 | 8.2 | 9.4 |

TABLE 1-continued

Composition and Physical Properties of Masterbatch Composition

| | | | Example A1 | Example A2 | Example A3 | Comparative Example A1 | | | |
|---|---|---|---|---|---|---|---|---|---|
| Name of Masterbatch Composition | | | M1 | M2 | M3 | R1 | XL-1 | XL-2 | XL-3 |
| XI | Mw | *10$^{-4}$ | 12.6 | 15.3 | 26.5 | 35.4 | 24.2 | 21.3 | 18.1 |
| | Mw/Mn | | 11 | 13 | 20 | 14 | 15 | 14 | 14 |
| Tensile Elongation | | % | 590 | 560 | 500 | 460 | 61 | 49 | 48 |
| Tensile Strength | | MPa | 22.4 | 21.7 | 20.8 | 18.5 | 18.7 | 19.4 | 18.7 |
| Flexural Modulus | | MPa | 1030 | 1000 | 950 | 770 | 1080 | 1110 | 1030 |
| IZOD Impact Strength at 23° C. | | kJ/m$^2$ | 17.2 | 17.5 | 34.0 | 67.3 | 29.5 | 14.0 | 14.0 |
| IZOD Impact Strength at −20° C. | | kJ/m$^2$ | 4.6 | 5.1 | 5.9 | 8.7 | 7.8 | 6.6 | 6.8 |

TABLE 2

Composition and Physical Properties of Polypropylene Composition

| | | | Example A4 | Example A5 | Comparative Example A2 | Comparative Example A3 | Comparative Example A4 | Comparative Example A5 |
|---|---|---|---|---|---|---|---|---|
| Composition | Masterbatch | R1 | | | 8 | | | |
| | Composition | M2 | 8 | | | | | |
| | | M3 | | 8 | | | | |
| | | XL-1 | | | | 8 | | |
| | | XL-2 | | | | | 8 | |
| | | XL-3 | | | | | | 8 |
| | Propylene | HOMO1 | 19 | 19.5 | 24.5 | 20 | 20 | 20 |
| | (Co)polymer | HOMO2 | 5.5 | 5.0 | | 4.5 | 4.5 | 4.5 |
| | | HECO1 | 18.5 | 18.5 | 18.5 | 18.5 | 18.5 | 18.5 |
| | | HECO2 | 10 | 10 | 10 | 10 | 10 | 10 |
| | Elastomer | C2C8-1 | 6 | 6 | 6 | 6 | 6 | 6 |
| | | C2C8-2 | 12 | 12 | 12 | 12 | 12 | 12 |
| | Talc | HTP05L | 21 | 21 | 21 | 21 | 21 | 21 |
| Physical | MFR | g/10 min | 45.1 | 45.5 | 43.7 | 41.9 | 44.6 | 43.6 |
| Properties | Density | g/cm$^3$ | 1.041 | 1.042 | 1.040 | 1.041 | 1.042 | 1.040 |
| | Flexural Modulus | MPa | 2160 | 2170 | 2140 | 2140 | 2130 | 2130 |
| | IZOD Impact Strength at 23° C. | kJ/m$^2$ | 36.6 | 34.4 | 37.3 | 16.3 | 17.4 | 17.4 |
| | IZOD Impact Strength at −20° C. | kJ/m$^2$ | 5.2 | 5.2 | 5.2 | 4.6 | 4.5 | 4.6 |
| | Spiral Flow at 100 MPa | cm | 116 | 117 | 114 | 109 | 111 | 114 |
| | Spiral Flow at 50 MPa | cm | 72 | 73 | 70 | 67 | 68 | 70 |

The results are shown in Tables 1 and 2. FIGS. 2(A) and 2(B) show the results of measuring die swell of masterbatch compositions and polypropylene resin compositions. Although the polypropylene resin composition of Comparative Example A2 had large die swell, the polypropylene resin composition did not have a sufficient level of fluidity as evidenced by the MFR and the weight average molecular weight of xylene insolubles of masterbatch composition R1.

3. Production of Masterbatch Compositions (No. 2)

Example B1

Production of Masterbatch Composition M4

Masterbatch composition M4 was produced similarly to M1, except that the hydrogen concentration in the first-stage reactor was changed to 0.81 mol %, the hydrogen concentration and C2/(C2+C3) in the second-stage reactor were changed to 200 molar ppm and 0.23 by molar ratio, respectively, and the residence time distribution in the first and second stages was adjusted such that the amount of the copolymer component became 32 wt %.

Example B2

Production of Masterbatch Composition M5

Masterbatch composition M5 was produced similarly to M4, except that the hydrogen concentration in the first-stage reactor was changed to 0.90 mol %, C2/(C2+C3) in the second-stage reactor was changed to 0.25 by molar ratio, and the residence time distribution in the first and second stages was adjusted such that the amount of the copolymer component became 30 wt %.

Example B3

Production of Masterbatch Composition M6

Masterbatch composition M6 was produced similarly to M5, except that the hydrogen concentration and C2/(C2+C3) in the second-stage reactor were changed to 150 molar ppm and 0.26 by molar ratio, respectively.

Example B4

Production of Masterbatch Composition M7

Masterbatch composition M7 was produced similarly to M5, except that the hydrogen concentration in the second-stage reactor was changed to 150 molar ppm.

Example B5

Production of Masterbatch Composition M8

Masterbatch composition M8 was produced similarly to M5, except that the hydrogen concentration in the second-stage reactor was changed to 100 molar ppm.

Comparative Example B1

Production of Masterbatch Composition R1'

A solid catalyst containing Ti and diisobutyl phthalate as an internal donor supported on $MgCl_2$ was prepared using the method described in Example 5 of EP Patent No. 728769. Next, the solid catalyst, triethylaluminum (TEAL) as an organoaluminum compound, and dicyclopentyl-dimethoxysilane (DCPMS) as an external electron donor compound were used and contacted at 12° C. for 24 minutes, in amounts such that the ratio by weight of TEAL to the solid catalyst became 20, and the TEAL/DCPMS ratio by weight became 10. Pre-polymerization was performed by maintaining the resulting catalyst system in liquid propylene in a suspended state at 20° C. for 5 minutes. The resulting pre-polymer was introduced into a first-stage polymerization reactor of a polymerization apparatus including two stages of serial polymerization reactors to produce a propylene homopolymer, which was purged of unreacted monomers, and thereafter, the polymer was introduced into a second-stage polymerization reactor to produce an ethylene-propylene copolymer. During polymerization, the temperature and pressure were adjusted, and hydrogen was used as a molecular weight regulator.

The polymerization temperature and the ratio of the reactants were as follows: in the first-stage reactor, the polymerization temperature was 70° C., and the hydrogen concentration was 1.70 mol %; in the second-stage reactor, the polymerization temperature was 80° C., the hydrogen concentration was 100 molar ppm, and C2/(C2+C3) was 0.25 by molar ratio. Further, the residence time distribution in the first and second stages was adjusted such that the amount of the copolymer component became 30 wt %. Using this polypropylene polymer, masterbatch composition R1' in the form of pellets was obtained similarly to M1.

Comparative Example B2

Production of Masterbatch Composition R2

Masterbatch composition R2 was produced similarly to M1, except that the hydrogen concentration in the first-stage reactor was changed to 0.81 mol %, the hydrogen concentration and C2/(C2+C3) in the second-stage reactor were changed to 300 molar ppm and 0.24 by molar ratio, respectively, and the residence time distribution in the first and second stages was adjusted such that the amount of the copolymer component became 31 wt %.

4. Production of Polypropylene Resin Compositions (No. 2)

[6] Block Polypropylene HECO3

Block polypropylene made from or containing a polypropylene homopolymer and an ethylene-propylene copolymer having the following characteristics was used.

The polypropylene homopolymer: MFR=250 g/10 minutes; content of xylene solubles at 25° C.=2.0 wt %

The block polypropylene: MFR=98 g/10 minutes; intrinsic viscosity of xylene solubles at 25° C.=2.0 dl/g The proportion of the ethylene-propylene copolymer contained in the block polypropylene=22.5 wt %

The proportion of ethylene units contained in the ethylene-propylene copolymer=34.5 wt %

Example B6

Production of a Polypropylene Resin Composition

Masterbatch composition M2 obtained in Example A2, HECOs 1 to 3, an elastomer (C2C8-2), and talc (HTP05L from IMI Fabi, LLC) were blended as shown in Table 4, and the mixture was further blended with the same amounts of additives as those in Example A4 based on a total amount of 100 parts by weight of the resin.

Examples B7 to B11

Production of Polypropylene Resin Compositions

The components were blended as shown in Table 4.

Comparative Examples B3, B4, and B5

Production of Comparative Polypropylene Resin Compositions

The components were blended as shown in Table 4.

The results are shown in Tables 3 and 4. As shown in FIG. 3, the masterbatch compositions exhibit increased die swell, and from the relation with FIGS. 2(A) and 2(B), polypropylene resin compositions containing the provided masterbatch compositions should exhibit increased die swell.

TABLE 3

Composition and Physical Properties of Masterbatch Composition

| | Name of Masterbatch Composition | | Example B1 M4 | Example B2 M5 | Example B3 M6 | Example B4 M7 | Example B5 M8 | Comparative Example B1 R1' | Comparative Example B2 R2 |
|---|---|---|---|---|---|---|---|---|---|
| Composition | Component (1) | wt % | 68.1 | 70.4 | 70.5 | 70.2 | 70.3 | 70.0 | 69.4 |
| | Component (2) | wt % | 31.9 | 29.6 | 29.5 | 29.8 | 29.7 | 30.0 | 30.6 |
| | Et Units in Component (2) | wt % | 28.6 | 30.5 | 31.2 | 30.1 | 30.1 | 30.0 | 29.5 |
| Physical Properties | Composition MFR | g/10 min | 7.7 | 13 | 10 | 9 | 10 | 10 | 11 |
| | XS | wt % | 25.8 | 23.3 | 22.8 | 23.8 | 24.1 | 23.0 | 26.5 |
| | XSIV | dl/g | 6.3 | 6.1 | 6.7 | 6.4 | 7.0 | 6.5 | 5.4 |
| | XI Mw | *$10^{-4}$ | 18.1 | 14.4 | 13.0 | 12.7 | 12.8 | 13.5 | 19.7 |
| | Mw/Mn | | 14.0 | 11.1 | 9.0 | 9.1 | 9.4 | 5.0 | 12.9 |
| | Tensile Elongation | % | Not Broken | 410 | 420 | 410 | 400 | Not Broken | 420 |
| | Tensile Strength | MPa | 20.8 | 22.0 | 22.3 | 21.9 | 21.6 | 20.5 | 21.6 |

TABLE 3-continued

Composition and Physical Properties of Masterbatch Composition

| Name of Masterbatch Composition | | Example B1 M4 | Example B2 M5 | Example B3 M6 | Example B4 M7 | Example B5 M8 | Comparative Example B1 R1' | Comparative Example B2 R2 |
|---|---|---|---|---|---|---|---|---|
| Flexural Modulus | MPa | 989 | 1065 | 1083 | 1061 | 1050 | 980 | 1033 |
| IZOD Impact Strength at 23° C. | kJ/m² | 48.1 | 16.1 | 19.2 | 24.8 | 21.0 | 21.0 | 39.3 |
| IZOD Impact Strength at −20° C. | kJ/m² | 7.1 | 5.5 | 5.8 | 5.9 | 6.0 | 6.0 | 6.1 |

TABLE 4

Composition and Physical Properties of Polypropylene Composition

| | | | Example B6 | Example B7 | Example B8 | Example B9 | Example B10 | Example B11 | Comparative Example B3 | Comparative Example B4 | Comparative Example B5 |
|---|---|---|---|---|---|---|---|---|---|---|---|
| Composition | Masterbatch Composition | M2 | 7 | | | | | | | | |
| | | R2 | | | | | | | 7 | | |
| | | M5 | | 7 | | | | | | | |
| | | M6 | | | 7 | | | | | | |
| | | M7 | | | | 7 | | | | | |
| | | M8 | | | | | 7 | | | | |
| | | M4 | | | | | | 7 | | | |
| | | R1 | | | | | | | | 7 | |
| | | R1' | | | | | | | | | 7 |
| | Propylene (Co)polymer | HECO1 | 45 | 45 | 45 | 45 | 45 | 45 | 45 | 27 | 45 |
| | | HECO3 | 12 | 12 | 12 | 12 | 12 | 12 | 12 | 29 | 12 |
| | | HECO2 | 10 | 10 | 10 | 10 | 10 | 10 | 10 | 10 | 10 |
| | Elastomer | C2C8-2 | 11 | 11 | 11 | 11 | 11 | 11 | 11 | 11 | 11 |
| | Talc | HTP05L | 15 | 15 | 15 | 15 | 15 | 15 | 15 | 15 | 15 |
| Physical Properties | MFR | g/10 min | 24.0 | 24.8 | 24.4 | 24.3 | 23.3 | 24.2 | 25.1 | 19.7 | 24.0 |
| | Density | g/cm³ | 0.998 | 0.996 | 0.990 | 0.994 | 0.996 | 0.995 | 0.995 | 0.995 | 0.995 |
| | Flexural Modulus | MPa | 1660 | 1640 | 1600 | 1630 | 1640 | 1640 | 1620 | 1630 | 1620 |
| | IZOD Impact Strength at 23° C. | kJ/m² | 49.6 | 49.1 | 50.9 | 51.3 | 51.5 | 50.9 | 50.5 | 54.3 | 51.0 |
| | IZOD Impact Strength at −20° C. | kJ/m² | 6.9 | 7.1 | 7.1 | 7.1 | 7.2 | 7.1 | 7.1 | 7.5 | 7.1 |
| | Flow Mark Start Position | mm | 154 | 129 | 137 | 133 | 127 | 134 | 128 | 132 | 127 |
| | Flow Mark Evaluation | | 2.6 | 2.9 | 2.7 | 2.5 | 2.8 | 2.8 | 3.6 | 3.9 | 3.6 |

5. Production of Polypropylene Resin Compositions (No. 3)

[7] Block Polypropylene HECO4

Block polypropylene made from or containing a polypropylene homopolymer and an ethylene-propylene copolymer having the following characteristics was used.

The polypropylene homopolymer: MFR=56 g/10 minutes; content of xylene solubles at 25° C.=1.5 wt %

The block polypropylene: MFR=29.0 g/10 minutes; intrinsic viscosity of xylene solubles at 25° C.=1.8 dl/g The proportion of the ethylene-propylene copolymer contained in the block polypropylene=26.0 wt %

The proportion of ethylene units contained in the ethylene-propylene copolymer=46 wt %

Examples C1 to C3

Production of Polypropylene Resin Compositions

Dry blends of HECO4 and masterbatch composition M3 at the weight ratios shown in Table 5 were melt-kneaded in the extruder (cylinder) of an injection molding machine to produce polypropylene resin compositions.

TABLE 5

Composition and Physical Properties of Polypropylene Composition

| | | | Example C1 | Example C2 | Example C3 | Comparative Example C1 |
|---|---|---|---|---|---|---|
| Composition | Propylene (Co)polymer | HECO4 | 95 | 90 | 85 | 100 |
| | Masterbatch Composition | M3 | 5 | 10 | 15 | |

TABLE 5-continued

Composition and Physical Properties of Polypropylene Composition

| | | | Example C1 | Example C2 | Example C3 | Comparative Example C1 |
|---|---|---|---|---|---|---|
| Physical Properties | MFR | g/10 min | 27.0 | 25.2 | 23.5 | 29.0 |
| | Tensile Elongation | % | 170 | 210 | 120 | 210 |
| | Tensile Strength | MPa | 20.3 | 20.2 | 20.2 | 20.2 |
| | Flexural Modulus | MPa | 1150 | 1130 | 1130 | 1160 |
| | IZOD Impact Strength at 23° C. | kJ/m$^2$ | 41.2 | 41.9 | 41.4 | 39.8 |
| | IZOD Impact Strength at 10° C. | kJ/m$^2$ | 27.4 | 33.4 | 33.5 | 16.9 |
| | Flow Mark Start Position | mm | 202 | 220 | 253 | 95 |
| | Flow Mark Evaluation | | 1.4 | 1.2 | 1.0 | 4.3 |

5. Evaluation Methods

[MFR]

MFR was measured in accordance with JIS K 7210, under the conditions of 230° C. and a load of 21.18 N.

[Ethylene concentration in copolymers]

For samples dissolved in a mixed solvent of 1,2,4-trichlorobenzene/deuterated benzene, measurements were performed by $^{13}$C-NMR, using JNM LA-400 ($^{13}$C resonant frequency 100 MHz) from JEOL Ltd.

[Density]

Density was measured in accordance with JIS K 7112.

[Sampling of Xylene Solubles]

In a flask containing 250 mL of o-xylene (solvent), 2.5 g of the polymer was placed, and the mixture was stirred for 30 minutes while being purged with nitrogen at 135° C. using a hot plate and a reflux device to completely dissolve the composition, and then cooled at 25° C. for 1 hour. The solution was filtered with filtering paper. One-hundred milliliters of the filtrate after being filtered were sampled and transferred into an aluminum cup or the like, evaporated to dryness at 140° C. while being purged with nitrogen, and allowed to stand at room temperature for 30 minutes to obtain xylene solubles (XS). Next, the container was maintained at 80° C. in an oven under vacuum until a certain weight was achieved, and then the weight of the polymer dissolved in xylene at room temperature was determined. The percent by weight of the polymer dissolved in xylene relative to the entire polymer was calculated, and defined as the amount of xylene solubles at 25° C.

[XSIV]

Using the xylene solubles as a sample, the intrinsic viscosity was measured in tetrahydronaphthalene at 135° C., using an Ubbelohde-type viscometer (SS-780-H1 from Shibayama Scientific Co., Ltd.).

[Sampling of Xylene Insolubles]

After filtering the xylene solubles, acetone was added to a residue that remained on the filtering paper (mixture of the xylene insoluble component and the solvent), the mixture was filtered, and then the unfiltered component was evaporated to dryness in a vacuum drying oven set at 80° C. to obtain xylene insolubles (XI).

[Mw and Mw/Mn of Xylene Insolubles]

Using the xylene insolubles as a sample, the weight average molecular weight (Mw) and the molecular weight distribution (Mw/Mn) were measured.

PL GPC220 from Polymer Laboratories Ltd. was used as the apparatus, 1,2,4-trichlorobenzene containing an antioxidant was used as the mobile phase, serially connected UT-G (one), UT-807 (one), and UT-806M (two) from Showa Denko K.K. were used as the columns, and a differential refractometer was used as the detector. As the solvent of a sample solution of the xylene insolubles, the same solvent as that of the mobile phase was used, and the sample for measurement was prepared by dissolving the xylene insolubles at a sample concentration of 1 mg/mL for 2 hours, with shaking at a temperature of 150° C. Five-hundred microliters of the sample solution were injected into the columns, and measurement was performed at a flow rate of 1.0 mL/minute, a temperature of 145° C., and a data capture interval of 1 second. Column calibration was performed by the third-order approximation, using polystyrene standard samples having molecular weights of 5800000 to 7450000 (shodex STANDARD from Showa Denko K.K.). As the Mark-Houwink coefficients, $K=1.21 \times 10^{-4}$ and $\alpha=0.707$ were used for the polystyrene standard samples, and $K=1.37 \times 10^{-4}$ and $\alpha=0.75$ were used for the polypropylene-based polymers.

[Tensile Properties]

A tensile test was performed at room temperature (23° C.) in accordance with JIS K6921-2. Tensile strength and elongation were measured at a tension speed of 50 mm/minute.

[Flexural Modulus]

A bending test was performed at room temperature (23° C.) in accordance with JIS K6921-2. Measurement was performed at a crosshead speed of 2 mm/minute.

[IZOD Impact Strength]

IZOD impact strength was measured under temperature conditions of 23° C. and −20° C., in accordance with JIS K7110.

[Flow Mark]

Evaluation of a flow mark was performed based on a flow mark start position and visual observation of a molded article.

(1) Evaluation Based on the Flow Mark Start Position

Using an injection molding machine equipped with a shaping mold having a film gate ("EC160N2" from Toshiba Machine Co., Ltd.), a flat plaque (140 mm×300 mm×3 mm) was injection-molded under the conditions of a cylinder temperature of 210° C., a mold temperature of 40° C., an injection time of 15 seconds, and a cooling time of 25 seconds. The surface appearance of the molded article was visually observed, and the distance (mm) from the gate position to the position where a tiger mark started to form was measured. A relatively longer distance indicates better surface appearance of the molded article.

(2) Evaluation Based on Visual Observation

Using the same flat plaque as in (1), the surface appearance was evaluated according to six grades in FIG. 4.

[Die Swell]

Using a capillary rheometer (Capilograph 1C from Toyo Seiki Seisaku-Sho, Ltd.), a molten resin 2 was extruded from a capillary 1, and die swell was determined from the ratio of diameter r of the molten resin extruded as shown in FIG. 1 to capillary size $r_0$, i.e., $R=(r/r_0)$. Capillary length: 10 mm; capillary size: 1.0 mm; inlet angle: 90°; set temperature: 230° C. for the masterbatch compositions shown in FIG. 2(A) and FIG. 3, and 210° C. for the polypropylene resin compositions shown in FIG. 2(B).

[Molding Fluidity]

Molding fluidity was evaluated based on the spiral flow length.

The spiral flow length was measured using an injection molding machine (J110AD from the Japan Steel Works, Ltd.) equipped with a spiral flow mold (flow path cross section: a trapezoid having an upper side of 8 mm, a lower side of 10 mm, and a height of 2 mm) in which Archimedes' spiral was formed. The molding conditions were as follows:

Cylinder temperature: 180° C.
Mold temperature: 40° C.
Injection pressure: 100 MPa
Injection speed: 20 mm/second
Dwell condition: 50 MPa and 100 MPa (both maintained for 10 seconds)
Cooling time: 10 seconds

REFERENCE SIGNS LIST

1 Capillary
2 Molten resin

What is claimed is:

1. A composition comprising:
    (A) a masterbatch composition comprising:
        a propylene homopolymer or copolymer as component (1) containing 0 to 3 wt % of ethylene or one or more C4-C10-α-olefin-derived units; and
        a propylene-ethylene copolymer as component (2) comprising 25 to 35 wt % of ethylene-derived units,
        wherein the ratio of component (1) to component (2) is 65 to 85 parts by weight: 15 to 35 parts by weight; and
        wherein the masterbatch composition has:
        1) a melt flow rate (230° C., load: 21.18 N) of 5 to 30 g/10 minutes;
        2) xylene insolubles with an Mw of $10\times10^4$ to $30\times10^4$ and an Mw/Mn of 6 to 20 as measured by GPC; and
        3) xylene solubles with an intrinsic viscosity of 5.5 to 9.0 dl/g; and
    (B) an hetero-phasic block polypropylene containing 5 wt. % or more of ethylene.

2. The composition according to claim 1, wherein the melt flow rate is 5 to 15 g/10 minutes.

3. The composition according to claim 1, wherein the xylene insolubles have an Mw/Mn of 7 to 20.

4. The composition according to claim 1 comprising 67 to 75 wt % of component (1) and 25 to 33 wt % of component (2).

5. The composition according to claim 1, wherein the content of the ethylene-derived units in the propylene-ethylene copolymer as component (2) is 27 to 33 wt %.

6. The composition according to claim 1, wherein the xylene solubles have an intrinsic viscosity of 6.0 to 8.0 dl/g.

7. The composition according to claim 1 obtained by polymerizing propylene and ethylene using a catalyst comprising:
    (A) a solid catalyst containing magnesium, titanium, halogen, and an electron donor compound selected from succinate-based compounds;
    (B) an organoaluminum compound; and
    (C) an external electron donor compound.

8. An injection-molded article obtained by injection-molding the composition according to claim 1.

* * * * *

UNITED STATES PATENT AND TRADEMARK OFFICE
CERTIFICATE OF CORRECTION

PATENT NO. : 11,098,184 B2
APPLICATION NO. : 16/471986
DATED : August 24, 2021
INVENTOR(S) : Yasumoto et al.

It is certified that error appears in the above-identified patent and that said Letters Patent is hereby corrected as shown below:

In the Specification

In Column 4, Line 39, delete "$Ti(OR)_gX_{4-g}m$" and insert -- $Ti(OR)_gX_{4-g}$, -- therefor Signed and Sealed this
Twenty-fourth Day of January, 2023

Katherine Kelly Vidal
*Director of the United States Patent and Trademark Office*